Oct. 6, 1970   B. L. CHAMBERLAND   3,532,641
TEMPERATURE-SENSITIVE ELECTRONIC CONDUCTORS OF
FLUORINE-MODIFIED VANADIUM DIOXIDE
Filed Aug. 29, 1968   3 Sheets-Sheet 1

INVENTOR
BERTRAND L. CHAMBERLAND

BY

ATTORNEY

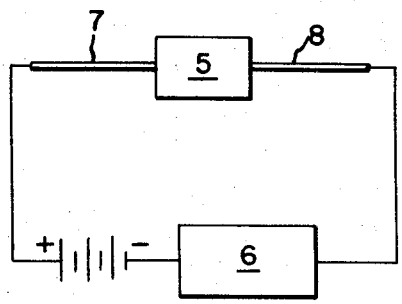
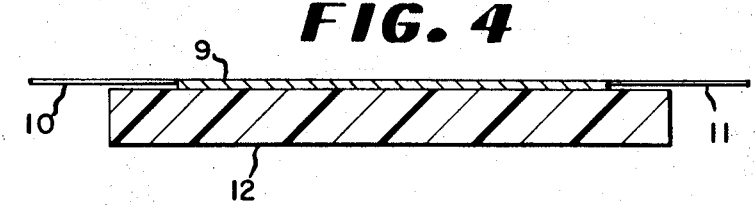

United States Patent Office 3,532,641
Patented Oct. 6, 1970

3,532,641
TEMPERATURE-SENSITIVE ELECTRONIC CONDUCTORS OF FLUORINE-MODIFIED VANADIUM DIOXIDE
Bertrand L. Chamberland, Chadds Ford, Pa., assignor to E. I. du Pont de Nemours and Company, Wilmington, Del., a corporation of Delaware
Filed Aug. 29, 1968, Ser. No. 756,109
Int. Cl. H01b 1/08
U.S. Cl. 252—521                         3 Claims

ABSTRACT OF THE DISCLOSURE

Vanadium dioxide modified with minor amounts of fluoride and optionally with metals other than vanadium are prepared preferably by hydrothermal synthesis at temperatures of 200–700° C. and high pressure. The compositions exhibit metallic conductivity above and semi-conductivity below a transition temperature which depends on the modification and are thus useful as temperature-sensitive switches.

BACKGROUND OF THE INVENTION

Field of the invention

This invention relates to vanadium dioxides modified with fluoride and, optionally, with metals other than vanadium which are tempearture-sensitive electrical conductors and to electronic devices using these modified oxides as the working component.

Description of the prior art

Vanadium dioxide, $V_2O_4$, exhibits a structural transformation at 67° C. from a monoclinic form stable at room temperature to a tetragonal, rutile-type structure above the transition. This transformation is accompanied by an abrupt change in several physical properties of $V_2O_4$, including a discontinuous drop in electrical resistivity of about three to four orders of magnitude as the behavior of the material goes from semiconducting to metallic conducting. The transformation is reversible. [J. B. Goodenough, Magnetism and the Chemical Bond, Interscience Monographs on Chemistry, F. A. Cotton Ed., vol. 1 (Interscience, John Wiley & Sons, New York, 1963), pp. 272–274; F. Morin, Phys. Rev. Letters 3, 34 (1959).]

In a copending application of Chamberland and Rogers, Ser. No. 735,013, filed June 6, 1968, there is disclosed vanadium dioxide modified with selected metal oxides that exhibits the structural transition at lower temperatures than does $V_2O_4$. It has now been discovered that the transition temperatures may be further modified by substitution of fluorine for part of the oxygen atoms of $V_2O_4$ compositions, optionally modified also with other metals.

SUMMARY OF THE INVENTION

The compositions of the present invention are of a single-phase and have the formula $$V_{2-x}M_xO_{4-y}F_y$$

in which $y$ is from 0.01 to 0.20 and $x+y \leq 0.20$ and M is metal selected from metals at the transition, post transition, and rare earth groups.

A preferred class of compositions is obtained when $x$ is 0, that is to say compositions defined by the formula $$V_2O_{4-y}F_y$$

The compositions of the present invention are preferably made by reacting a mixture selected from metals, metal oxides, metal fluorides and metal oxyfluorides and fluorine sources selected from HF and $NH_4HF_2$ in amounts sufficient to provide an atomic ratio of metal (including vanadium) to non-metal (oxygen and fluorine) of about 1:2 and to provide sufficient modifying metal and fluorine to give compositions having the formula $V_{2-x}M_xO_{4-y}F_y$ in the presence of water at a temperature of 200 to 700° C., and under a pressure of 2 to 3 kilobars.

The modified vanadium dioxides of the present invention can have atomic ratios of total metal to total non-metal which deviate slightly from the ideal ratio of 1:2. It is well known in the art that similar compositions can deviate from the exact stoichiometry. See for example, Wadsley's chapter in Mandelcorn, Non-Stoichiometric Compounds, Academic Press, New York, 1964, pp. 98–209. Such compositions which deviate slightly from the ideal compositions are intended to be within the scope of this invention.

The modified vanadium dioxides of the present invention are useful as components in temperature-sensitive electrical switching devices. Such devices are useful as thermostats for heating or cooling equipment. They are also useful as storage elements in bistable resistor devices.

Details of the invention may be better understood from the remainder of the specifications and from the appended drawings in which:

FIG. 3 is a sketch of an electrical circuit showing an embodiment of this invention; and FIG. 4 is a side view of an electrical switching device of this invention.

DETAILED DESCRIPTION OF THE INVENTION

Figure 1:
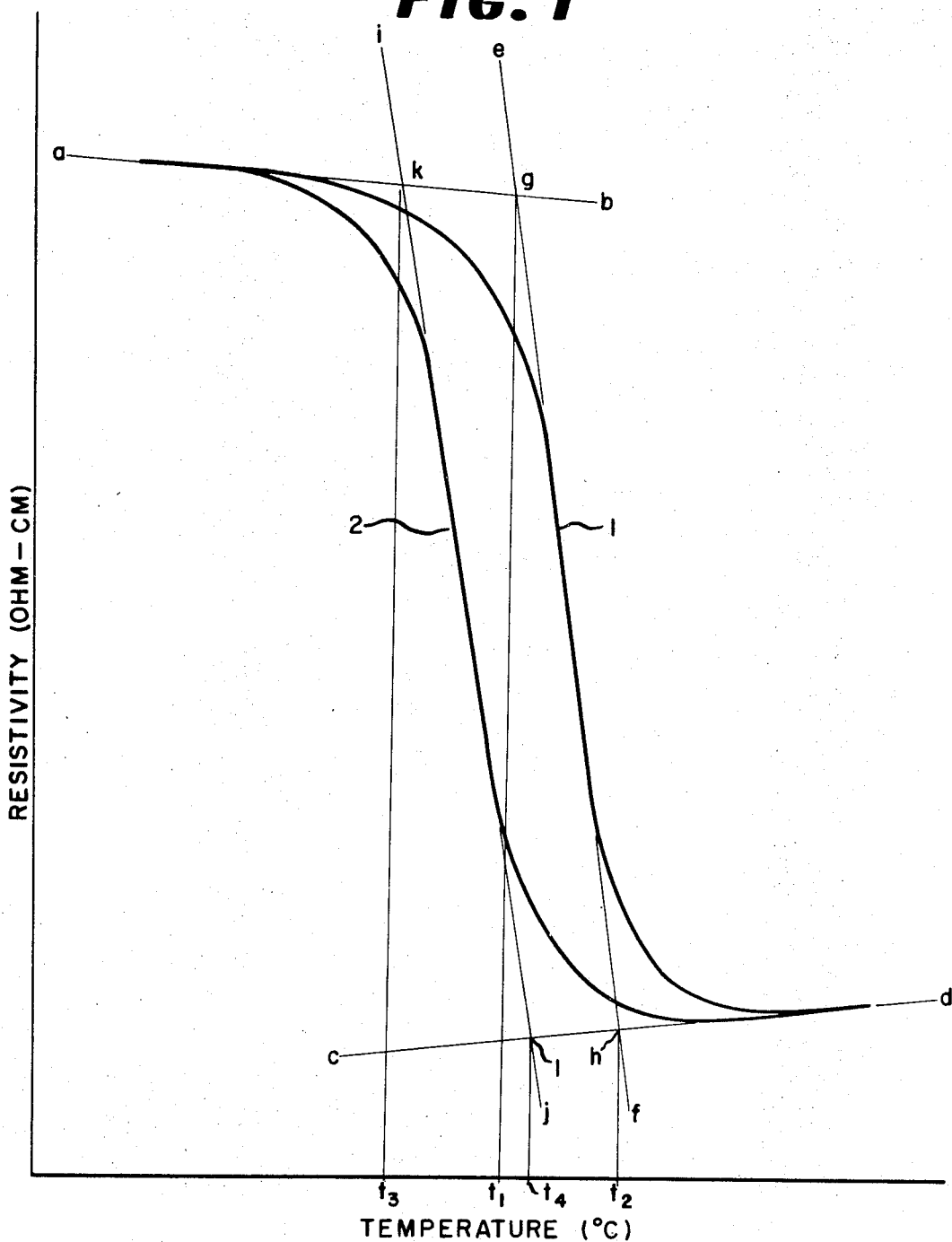
FIG. 1 is a generalized representation of the effect of temperature on the resistivity properties of the compounds of this invention.

The preferred process for making the compositions of the present invention is the hydrothermal reaction of ingredients containing the metallic elements and non-metallic elements in appropriate proportions as elements or compounds with each other, or, in the case of fluorine, as HF or $NH_4HF_2$. Such ingredients include vanadium pentoxide, $V_2O_5$; vanadium sesquioxide, $V_2O_3$; vanadium dioxide, $V_2O_4$; vanadium trifluoride, vanadium oxyfluoride, $VOF_3$; and oxides, fluorides and oxyfluorides of the transition metals, post transition metals, or rare earth metals. This hydrothermal synthesis is carried out conveniently in the presence of small amounts of water in sealed, thin-walled platinum or gold tubes inserted in a pressure vessel. External pressure, preferably of 2 to 3 kilobars, is applied and reaction is effected within a few hours, preferably at a temperature of 200–500° C. although higher or lower temperatures can be used.

It is essential that the products are homogeneous in order to obtain a sharp transition having a magnitude sufficiently great for use in the switching devices that are a part of the present invention. In most instances the hydrothermal synthesis described above produces the desired homogenous product. In some instances, inhomogenous products may be produced. In such cases, the products can be homogenized by heating in an inert atmosphere to a temperature between 500 and 1000° C. at a pressure of 1 to 65 kilobars or higher.

While the aforesaid hydrothermal synthesis is the preferred method of making the compositions of the present invention, other methods can be employed. Thus, heating mixtures of vanadium oxides and metal fluorides in an inert atmosphere, generally under pressure, can be used to make the compositions of this invention. Other methods include treating $V_2O_4$, or $V_2O_4$ modified with other transition metal or rare earth oxides, with a fluorinating agent, preferably under hydrothermal conditions. Methods of making metal modified $V_2O_4$ compositions include reacting $V_2O_4$ with an appropriate amount of a transition metal oxide

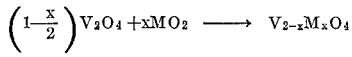

which can then be further reacted with $VF_3$, $VOF_3$, HF, $NH_4HF_2$, $F_2$, or the like, to yield a product of composition $V_{2-x}M_xO_{4-y}F_y$.

The reaction of transition, post transition or rare earth metals with vanadium oxides, e.g., $V_2O_4$, $V_2O_5$ and M, or $V_2O_5$, $V_2O_3$, and M, produces metal modified $V_2O_4$ compositions that can thereafter be reacted with fluoride. In these syntheses the metal, present in a finely divided state, is oxidized by reducing the higher-valent oxides of vanadium, preferably at 800–1000° C., to yield a modified derivative of vanadium dioxide. Similarly, syntheses can be accomplished by the reaction of metal vanadates with $V_2O_4$, preferably at temperatures of 900–1200° C. The reaction of $MVO_4$ and $V_2O_4$ is expressed by the equation:

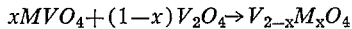

The mixture of metal oxides used to make metal-modified $V_2O_4$ can be composed of the oxides of metals having oxidation states of +5, +3, +4 and +2. Preferably, the number of equivalent weights present of the metal of oxidation state of +5 is *equal* to the number of equivalent weights present of the metal of oxidation state of +3 or lower so that the product will contain a total metal (including vanadium) to oxygen ratio of 1:2. However, slight deviations from this stoichiometric ratio are within the scope of this invention provided that these deviations do not lead to the formation of multiple phases or to the loss of the desired electrical transition. An excess of $V_2O_5$ can be used as a flux to promote reaction or crystal growth. In this case, the reactants contain an excess equivalent weight of pentavalent metal oxide. However, this excess is removed after reaction by leaching and the product again has a total metal to oxygen ratio of approximately 1:2.

For making metal-modified $V_2O_4$ at autogenous external pressure, the reaction vessel is preferably a heat resistant glass of fused silica tube and in this case the vessel can be evacuated to remove air and sealed. Sealed vessels of other high melting, inert materials, such as platinum, gold, stainless steel and the like, can be similarly used provided that appropriate precautions, such as application of external pressure, evacuation, crimping to expel air, and the like, are taken to prevent vessel rupture due to the development of internal pressure on heating. For reactions involving application of external pressure, collapsible vessels, such as thin-walled tubes of platinum, gold, and the like, are preferred. Optionally, reaction can be effected in the presence of a fluxing agent, such as excess $V_2O_5$, in order to promote formation or crystal growth of the desired modified oxide. The excess $V_2O_5$ can subsequently be removed by leaching in a warm (approximately 50 to 65° C.) basic, aqueous solution.

Solid state reactions of oxides of the modifying metal, M, with vanadium oxides are effective in preparing the metal-modified vanadium dioxide compositions. In these syntheses the reactant oxides, for example (a) $V_2O_4$ and $MO_2$, (b) $V_2O_4$, $V_2O_5$, and $M_2O_3$, (c) $V_2O_5$, $V_2O_3$ and $MO_2$, and the like, are intimately mixed, e.g., by grinding or ball milling, and then heated under nonoxidizing conditions in a sealed, evacuated reaction tube or under an inert atmosphere as described above. For convenience, reaction parameters of temperature and time in this embodiment are normally 800–1000° C. and 1 to 24 hours, respectively.

In syntheses under high external pressures, the intimately mixed reactants are heated to 500–1400° C. at a pressure of 20–65 kb., or higher, for a period of a few hours. Pressures of up to 70 kilobars can be developed in a tetrahedral anvil device described in U.S. 3,372,997. Some of the products prepared under these conditions have an orthorhombic-type crystal symmetry. This change of symmetry can reflect some slight deviation from stoichiometry.

The formation of $V_2O_4$ or modified $V_2O_4$ followed by insertion of fluoride using volatile fluorinating agents such as HF, $F_2$ or $NH_4HF_2$ is particularly useful in the manufacture of thin films for use in electrical switching devices.

Thin films (500–4000 A. in thickness) of vanadium dioxide or modified vanadium dioxide can be produced by use of a "sputtering" technique as described for unmodified $VO_2$ by G. A. Rozgonyi et al., Appl. Phys. Letters, 8, 220 (1966) or E. N. Fuls, et al., ibid, 10, 199 (1967), and the post-deposition treatment described by G. A. Rozgonyi et al., J. Electro. Chem. Soc. 115, 56 (1968).

The preparation of thin films of the modified vanadium dioxide can be accomplished by a reactive sputtering technique comprising the use of an alloy consisting of vanadium and the modifying element, M, where M is as defined above. The operation can be carried out in a standard DC sputtering apparatus capable of operation at low pressures with the desired alloy as the cathode. Initially, the apparatus is evacuated ($10^{-5}$ to $10^{-8}$ torr) in order to remove traces of undesired gases or other volatile material and then a mixture of argon-oxygen (1–3% oxygen) is admitted to a final pressure of about $10^{-2}$ to $10^{-1}$ torr. On application of a DC voltage greater than about 400 v., the alloy is sputtered and partially oxidized by the active oxygen atmosphere onto a suitable substrate, e.g., a wafer of sapphire or rutile, that is maintained at a temperature of 500° C. or lower. The operation results in a film of metal-modified vanadium oxides that must be post-treated to obtain the proper oxygen to metal ratio of about 2:1. The post-deposition treatment described by Rozgonyi, et al., for thin films of $VO_2$ is also convenient for the modified oxides and consists merely of annealing the deposited film in water vapor. Following the formation of the oxide film, fluorine can be substituted for part of the oxygen of the vanadium dioxide by treatment with HF, $F_2$ or $NH_4HF_2$ preferably at temperatures of 50 to 500° C.

The products of the present invention generally have a monoclinic crystal structure below the transition temperature and exhibit semiconductivity. On heating, the crystal structure abruptly changes to one with tetragonal symmetry which exhibits metallic conductivity. The process is reversible, but exhibits some hysteresis. When fluorine is introduced into the lattice of vanadium dioxide, the transition temperature decreases as a function of fluorine content. For $V_2O_{3.8}F_{0.2}$ the transition occurs at about −68° C. in comparison with 67° C. for unmodified $V_2O_4$. Surprisingly, such a degree of modification can be achieved while maintaining the transition sufficiently sharp and of sufficient magnitude to form useful electrical switching devices.

FIG. 1 is a generalized representation of the temperature sensitive conductive properties of the modified vanadium dioxides of this invention. Curve 1 is a plot of electrical resistivity (in ohm-cm.) of a typical modified metal oxide of this invention versus temperature (° C.) measured with increasing temperature. Curve 2 is a similar plot measured with decreasing temperature. The abruptness of the reversible change in electrical properties from semiconducting to metallic conducting is determined by the intercepts of line *e–f*, drawn tangentially through the inflection point of curve 1 where resistance changes most rapidly with temperature, with lines *a–b* and *c–d*, which are extrapolations of the approximately linear portions of the curve at temperatures below and above the transition. These intersections of *a–b* with *e–f* and *c–d* with *e–f* give points *g* and *h*, which correspond to $t_1$ and $t_2$, respectively, on the temperature scale. The modified metal oxides of this invention show an abrupt change from semiconducting to metallic conducting electrical properties within a temperature range of 10° C. ($t_2$ minus $t_1$ equals 10° C.) or less.

The line *i–j* is drawn tangentially to the portion of curve 2 having the greatest change in electrical properties as a function of temperature. The intersections of line $i$–$j$ with lines $a$–$b$ and $c$–$d$ gives points $k$ and $l$, respectively, which correspond to points $t_3$ and $t_4$, respectively. The modified metal oxides of this invention show an abrupt change from metallic conducting to semiconducting electrical properties within a temperature range of 10° C. ($t_4$ minus $t_3$ equals 10° C.) or less. The hysteresis shown by curves 1 and 2 is approximately represented by the average of the differences $t_2$ minus $t_4$ and $t_1$ minus $t_3$. The hysteresis is 10° C. or less. Small values of hysteresis, e.g., 10° C. or less, is also critical for the use of the compounds of this invention as elements of switching devices.

The hysteresis of a fluorine modified $VO_2$ sample can be determined either by electrical or differential thermal measurements. In the first case, the electrical resistivity data obtained by heating and cooling the sample through the transition temperature is used in the manner taught by FIG. 1, where $$H = \frac{(t_2 - t_4) + (t_1 - t_3)}{2}$$

By differential thermal analysis the sample is heated then cooled through the transition temperature at a rate of approximately 1° C. or less per minute. The onset of the endotherm is found experimentally to be equal approximately to $t_1$ while the termination of the endotherm is substantially equal to $t_2$. The onset of the exotherm is found experimentally to be approximately equal to $t_4$ while the termination of the exotherm is substantially equal to $t_3$. Substituting these values into the above formulation it is found that the hysteresis can be determined by DTA to be substantially equal within error to that determined electrically.

Preferably, the magnitude of the reversible change between semiconducting and metallic conducting electrical properties is 1,000 to 10,000 ohm-cm. Compositions having magnitude changes of 10 or more ohm-cm. are operative in the switching devices of this invention, provided that the transition is abrupt.

Figure 2:
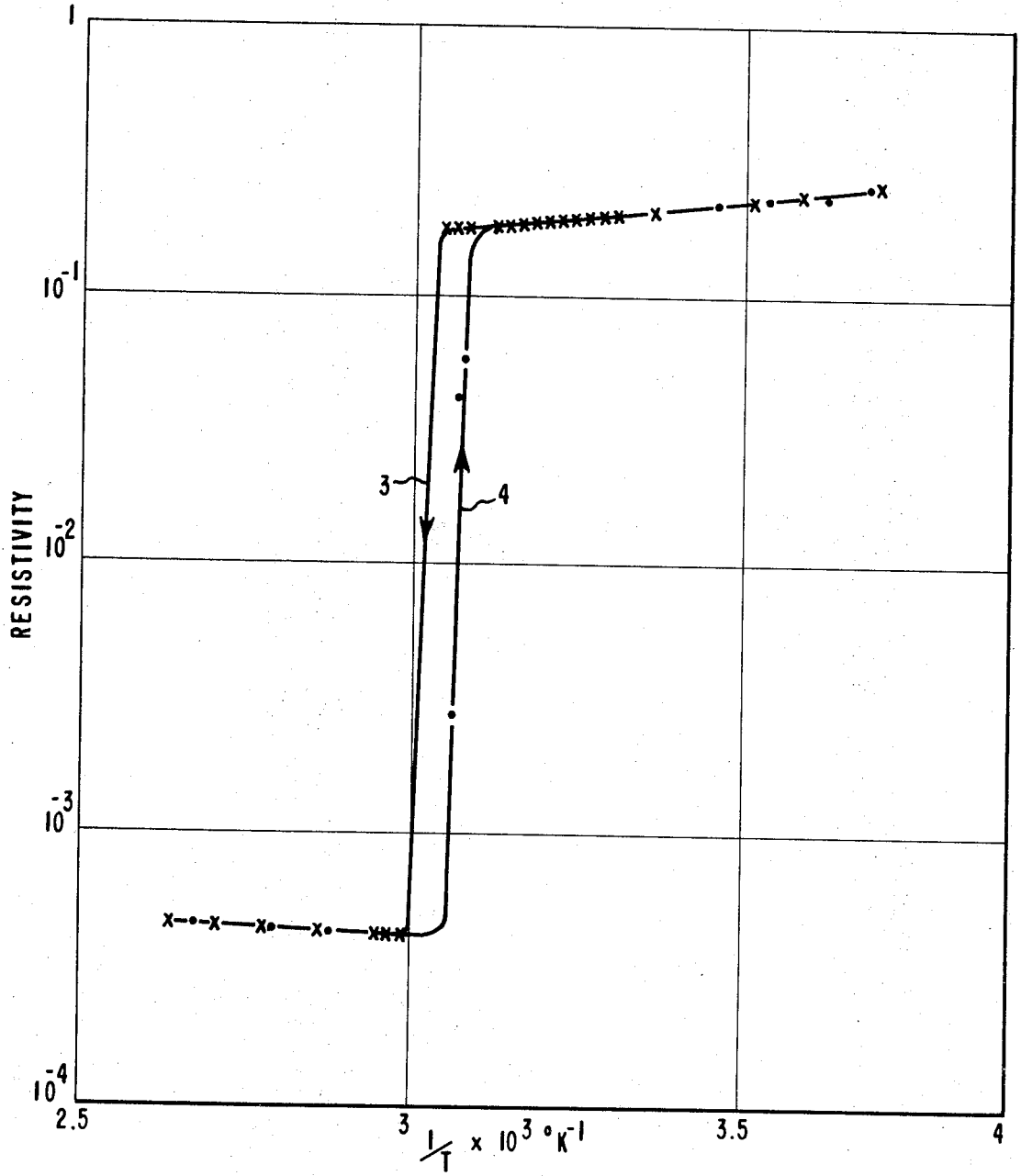
FIG. 2 is a plot of the logarithm of the resistivity of a product having the formula 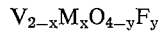 when $y=0.025$ as a function of the inverse of temperature.

The electrical behavior for a single crystal of composition $V_2O_{3.975}F_{0.025}$ is shown in FIG. 2, wherein curve 3 is a plot of electrical resistivity (ohm-cm.) versus the reciprocal of temperature, in degrees Kelvin, times $10^3$. Curve 3 was determined by measuring the resistivity with increasing temperature. Curve 4 is a similar plot measured with decreasing temperature. The abruptness of the transition, as demonstrated by curves 3 and 4, is less than about 2° C. The hysteresis is about 8° C.

This invention is further illustrated by the following examples which should not, however, be construed as fully delineating the scope of this discovery. In these examples all parts are by weight unless otherwise specified.

EXAMPLES 1–12

Vanadium sesquioxide, vanadium pentoxide, vanadium trifluoride and water were sealed in thin-walled gold tubes, placed in a pressure vessel and heated in each case under external pressure of 3 kilobars. The black crystalline products were isolated from the blue solution by filtration, washed with water alcohol and acetone, then air-dried. The details of the syntheses and the products produced are shown in Table I. X-ray examination of the products at 25° C. showed that products having a transition temperature greater than 25° C. had a monoclinic structure, while products having a transition temperature below 25° C. had a tetragonal structure.

TABLE I

| Ex. | Composition | | | | Reaction Temp., ° C. | Reaction Time, Hrs. | Product $V_2O_{4-y}F_y$ | |
|---|---|---|---|---|---|---|---|---|
| | $V_2O_3$ | $V_2O_5$ | $VF_3$ | $H_2O$ | | | y | $T_t$(° C.) |
| 1 | 0.90 | 1.09 | 0.004 | 0.25 | 700 | 15.75 | 0.009 | 67 |
| 2 | 0.90 | 1.08 | 0.009 | 0.25 | 700 | 15.75 | 0.012 | 66 |
| 3 | 0.90 | 1.08 | 0.013 | 0.25 | 700 | 15.75 | 0.012 | 65 |
| 4 | 0.91 | 1.07 | 0.017 | 0.25 | 700 | 15.75 | 0.019 | 64 |
| 5 | 0.91 | 1.06 | 0.026 | 0.25 | 700 | 15.75 | 0.020 | 61 |
| 6 | 0.91 | 1.04 | 0.043 | 0.25 | 700 | 15.75 | 0.026 | 59 |
| 7 | 0.92 | 1.02 | 0.054 | 0.25 | 700 | 15.75 | 0.025 | 56 |
| 8 | 0.91 | 1.04 | 0.04 | 0.25 | 700 | 15–17 | 0.03 | 59 |
| 9 | 0.93 | 0.98 | 0.09 | 0.25 | 700 | 15–17 | 0.04 | 42 |
| 10 | 0.94 | 0.96 | 0.11 | 0.5 | 600 | 16 | 0.08 | 8 |
| 11 | 0.96 | 0.87 | 0.17 | 0.5 | 600 | 18 | 0.13 | −25 |
| 12 | 0.96 | 0.87 | 0.17 | 0.25 | 700 | 15–17 | 0.20 | −68 |

EXAMPLES 13–19

In each of these examples 0.452 part of $V_2O_3$, 0.548 part of $V_2O_5$, 0.5 part of water and the indicated amounts of $NH_4HF_2$ were sealed in collapsible gold tubes and heated to 600° C. under 3 kilobars external pressure for 15 hours. The black crystalline products were isolated by filtration, washed and dried in air. The results are shown in Table II.

TABLE II

| Examples | Parts $NH_4HF_2$ | Product $V_2O_{4-y}F_y$ | | Crystal Structure |
|---|---|---|---|---|
| | | y | $T_t$ | |
| 13 | 0.005 | 0.006 | 66 | M |
| 14 | 0.010 | 0.008 | 66 | M |
| 15 | 0.015 | 0.009 | 64 | M |
| 16 | 0.030 | 0.014 | 61 | M |
| 17 | 0.040 | 0.024 | 60 | M |
| 18 | 0.050 | 0.026 | 59 | M |
| 19 | 0.060 | 0.102 | 0 | T |

M = Monoclinic; T = Tetragonal.

EXAMPLES 20–32

Using the general procedure of Examples 1 to 12 transition and other metal fluorides were employed in Examples 20–32 as indicated in Table III, instead of vanadium trifluoride to prepare modified vanadium dioxides containing both the indicated metal and fluorine $y \sim 0.025$. Using 3 kilobars, reaction time in all cases was 15 hours. Transition temperatures for each modification are also shown in the Table.

TABLE III

| Examples | Fluoride Reactant | $T_t$ |
|---|---|---|
| 20 | $CrF_3 \cdot 3H_2O$ | 51 |
| 21 | $MnF_3$ | 53 |
| 22 | $FeF_3$ | 51 |
| 23 | $CoF_3$ | 46 |
| 24 | $ScF_3$ | 63 |
| 25 | $SnF_2$ | 60 |
| 26 | $CuF_2 \cdot 2H_2O$ | 60 |
| 27 | $TbF_3$ | 58 |
| 28 | $EuF_3$ | 63 |
| 29 | $(NH_4)_2GeF_6$ | 59 |
| 30 | $(NH_4)_2TiF_6$ | 60 |
| 31 | $NH_4VOF_4$ | 60 |
| 32 | $ZrF_4$ | 59 |

All the fluoride-modified metal oxides of this invention are useful as components of devices for use in electronic circuitry. For example, the fluoride-modified metal oxides can be used as the working or active element of a temperature activated, or temperature sensitive, switching device such as a thermostat. Such devices are useful for actuating fire alarms or for controlling automatic fire sprinklers. Preferably, for this utility, the fluoride-modified oxides have a transition temperature in the temperature range of 50–65° C. For temperature control nearer room conditions, e.g., for comfort control or for control of a constant temperature bath near ambient conditions, a transition in the temperature range 20–40° C. is preferred. A switching device can be made from a fluoride-modified metal oxide in the form of a sintered plug or rod, a crystal or a thin film. Electrical contact wires or leads are connected to form an electrical contact with the plug, crystal or thin film.

This utility is further illustrated in FIG. 3, where 5 is an oxide of this invention in the form of a plug, crystal or thin film and 7 and 8 are leads connected to the plug, crystal or thin film of the fluoride-modified oxide. In FIG. 3, 6 represents a fire alarm or sprinkler that is activated by an electric current. The electric circuit is closed by a rise in the temperature of the area controlled to a temperature above the transition point. At that point the fluoride-modified oxide becomes a metallic conductor, the circuit is closed and the alarm or sprinkler is activated.

The temperature-sensitive switch can be used as a bistable resistor element, i.e., a device that has a stable high-current state and a stable low-current state at constant applied voltage. Such a bistable resistor device has utility as a storage element for computers. [P. F. Bongers and U. Enz., Philips Res. Repts. 21, 387 (1966).]

A plug for the above uses is formed by pressing one of the modified oxides in the form of a finely divided powder with or without a binder, in a mold at pressures of about 50,000 p.s.i. followed by sintering at temperatures of the order of 1200–1400° C. Crystals that are formed in the process of this invention can be used directly in this application. Thin films of the fluoride-modified vanadium dioxide can be made as described hereinabove.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A temperature-sensitive electrically conductive fluoride-modified vanadium dioxide having the formula $$V_{2-x}M_xO_{4-y}F_y$$

wherein $y$ is from 0.01 to 0.2 and $x+y \leq 0.2$ and M is a transition metal, a post-transition metal or a rare earth metal.

2. A temperature-sensitive electrically conductive fluoride-modified vanadium dioxide of claim 1 wherein $x$ is 0 having the formula $$V_2O_{4-y}F_y$$

3. A temperature stable switch containing a fluoride-modified metal oxide of claim 1 or claim 2.

References Cited

UNITED STATES PATENTS 3,365,269 1/1968 Chamberland _____ 23—51
3,402,131 9/1968 Futaki et al. _____ 252—518

DOUGLAS J. DRUMMOND, Primary Examiner

U.S. Cl. X.R.

23—51